United States Patent [19]

Martin

[11] Patent Number: 5,638,902

[45] Date of Patent: Jun. 17, 1997

[54] WATER FLOW OBSTRUCTION PROCESS

[76] Inventor: Waylan C. Martin, P.O. Box 1468, Monahans, Tex. 79756

[21] Appl. No.: 415,371

[22] Filed: Mar. 30, 1995

[51] Int. Cl.$^6$ ............................................. E21B 43/22
[52] U.S. Cl. .......................... 166/270; 166/275; 166/400
[58] Field of Search ................................. 166/270–275, 166/292

[56] References Cited

U.S. PATENT DOCUMENTS

| | | |
|---|---|---|
| 3,530,937 | 9/1970 | Bernard . |
| 3,837,400 | 9/1974 | Martin . |
| 3,876,002 | 4/1975 | Sarem . |
| 4,024,917 | 5/1977 | Martin . |
| 4,232,740 | 11/1980 | Park . |
| 4,287,951 | 9/1981 | Sydansk et al. . |
| 4,304,301 | 12/1981 | Sydansk . |
| 4,352,395 | 10/1982 | Sydansk . |
| 4,433,728 | 2/1984 | Sydansk et al. . |
| 4,433,729 | 2/1984 | Sydansk . |
| 4,892,146 | 1/1990 | Shen . |
| 5,145,002 | 9/1992 | McKay ................. 166/275 X |
| 5,203,411 | 4/1993 | Dawe et al. ........... 166/275 X |

OTHER PUBLICATIONS

"DOE selects proposals for oilfield demonstration projects", PRRC Biannual Newsletter, Winter 1994–1995, p. 1.

"PRRC teams with Parker and Parsley", PRRC Biannual Newsletter, Winter 1994–1995, p. 1.

"Strata to work in Nash Draw Bushy Canyon Pool", PRRC Biannual Newsletter, Winter 1994–1995, p. 2.

"PTTC activities", PRRC Biannual Newsletter, Winter 1994–1995, p. 3.

"Improved techniques for fluid diversion in oil recovery", PRRC Biannual Newsletter, Winter 1994–1995, p. 4.

"Establishing links to researchers in China", PRRC Biannual Newsletter, Winter 1994–1995, p. 6.

*Primary Examiner*—Roger J. Schoeppel
*Attorney, Agent, or Firm*—Novak Druce Reynolds Burt

[57] ABSTRACT

The present invention provides a method for restricting a fluid flow path in subterranean geological formations to facilitate the removal of hydrocarbons from the subterranean geological formation during enhanced oil recovery techniques. The method includes the steps of injecting a first water volume into the fluid flow path thereby displacing fluids present in the fluid flow path. The next step is injecting an alkaline volume into the fluid flow path thereby displacing the first water volume ahead of the alkaline volume. The injections create a first water and alkaline mixed continuum between the first water volume and the hydroxide volume wherein the relative concentrations of water and hydroxide vary along a length of the first water and hydroxide mixed continuum wherein the relative concentrations of water and alkaline are conducive to the formation of scale upon the surfaces of the subterranean geological formation.

17 Claims, 1 Drawing Sheet

WATER FLOW OBSTRUCTION PROCESS

BACKGROUND OF THE INVENTION

1) Field of the Invention

The present invention relates generally to removal of hydrocarbons from subterranean geological formations and more particularly to introducing a material to chemically interact with bicarbonate in the water within the formation producing carbonate scale in the formation interstices, channels and other openings.

2) Description of the Related Art

Waterflooding to increase hydrocarbon production is well known in the art. When a producing well is first drilled, hydrocarbons can be brought to the surface without any enhanced oil recovery techniques such as waterflooding. After a certain period of production, however, hydrocarbons no longer flow into the producing well. To re-establish pressure to produce additional oil, waterflooding can be used.

The waterflood process is injecting water through an injection well. The water displaces hydrocarbons toward a producing well. At the producing well, the hydrocarbons can be pumped to the surface. However the waterflood process causes channelization to occur. The water, instead of flooding the entire subterranean geological formation, forms channels through the formation and goes almost directly from the injection well to the producing well so that the producing well pumps mostly injected water instead of hydrocarbons. Therefore, the well produces small amounts of hydrocarbons and incurs additional expense by pumping excess amounts of water.

To solve the problem of channelization, previous work in the field has sought to form precipitates within underground formations to plug the channels in the formation. U.S. Pat. No. 3,837,400 to Martin for Selective Plugging Process and U.S. Pat. No. 4,024,917 to Martin for Calcium and Magnesium Hydroxide Plugging Process include the disclosure of a method of forming precipitates to plug channels and interstices within a geological formation.

These patents include disclosure of a multi-step process to accomplish such "plugging" as follows: (i) injecting water low in metallic ions; (ii) injecting an aqueous solution of hydroxide into the formation; (iii) injecting water low in metallic ions after the hydroxide solution; and (iv) injecting water high in metallic ions, such as brine or flood water, into the geological formation. During this final step the injection of brine or flood water occurs at a high enough rate to cause thorough mixing of the fluids in the formation which precipitates nearly all of the magnesium hydroxide and other compounds into particulate form. These magnesium hydroxide particulates and other compounds plug channels and interstices in the formation. However this process does not adequately plug the formation because some of the fluid flow paths in the formation are too large to be plugged by particulates. Therefore only a partial plugging, if any, of the formation occurs.

SUMMARY OF THE INVENTION

The current invention is a method for obstructing fluid flow paths in subterranean geological formations that have been channelized due to enhanced oil recovery techniques such as waterflooding. The method involves the steps of preparing the well to be treated, injecting the treatment, allowing the treatment to slowly spread into the fluid flow paths to be obstructed, and increasing slowly the injection rate of water high in metallic ions so that the treatment will slowly mix with fluids in the formation creating a solution with a pH conducive to the formation of calcium carbonate scale. The calcium carbonate scale completely obstructs large interstices and openings that the particulate processes fail to do. Once the channelized fluid flow paths in the formation are obstructed, additional water can be injected into the formation to displace oil toward a producing well. Also the obstruction process reduces the amount of water produced in the offset producing well thereby greatly reducing the amount of brine water that has to be handled and disposed. By reducing the amount of brine water to be disposed, this process benefits the environment as well as reducing disposal costs.

Accordingly, a primary object of the present method is providing a process whereby carbonate scale forms within a subterranean geological formation obstructing channelized interstices and openings.

A further object of the present method is causing a mingling of treatment fluids with formation and brine water thereby forming scale within the formation.

Another object of the present method is reducing the rate of brine water production.

An additional object of the present method is providing an alternative process whereby injecting displacement water high in calcium and bicarbonate down one string while also injecting an alkaline down another string. The injection fluids mix at a specified location in the formation creating a solution conducive to scale formation. The scale obstructs fluid flow at the specified location.

Another object of the present method is providing processes for obstructing a producing well by utilizing a physical separating mechanism or a displacement water with a low content of metallic ions.

In accordance with these aims, one embodiment of the present invention is providing a method for restricting a fluid flow path in subterranean geological formations to facilitate the removal of hydrocarbons from the subterranean geological formation during enhanced oil recovery techniques. The method comprises the steps of injecting a first water volume into the fluid flow path thereby displacing fluids present in the fluid flow path. The next step is injecting an alkaline volume into the fluid flow path thereby displacing the first water volume ahead of the alkaline volume. The injections create a first water and alkaline mixed continuum between the first water volume and the hydroxide volume wherein the relative concentrations of water and hydroxide vary along a length of the first water and hydroxide mixed continuum wherein the relative concentrations of water and alkaline are conducive to the formation of scale upon the surfaces of the subterranean geological formation.

Another embodiment of this method for restricting a fluid flow path in subterranean geological formations to facilitate the removal of hydrocarbons from the subterranean geological formation, comprises the step of injecting a first reactant that mixes with a second reactant thereby creating a solution conducive to the formation of scale upon fluid flow paths.

BRIEF DESCRIPTION OF THE DRAWINGS

The present invention is further described in connection with the accompanying drawings, in which.

DETAILED DESCRIPTION OF THE INVENTION

Reference will now be made in detail to the preferred embodiments of the invention, examples of which are illustrated in the accompanying drawings. While the invention will be described in conjunction with some of the invention embodiments, it will be understood that they are not intended to limit the invention to those embodiments. On the contrary, the invention is intended to cover alternatives, modifications and equivalents, which may be included within the spirit and scope of the invention as defined by the appended claims.

Figure 1:
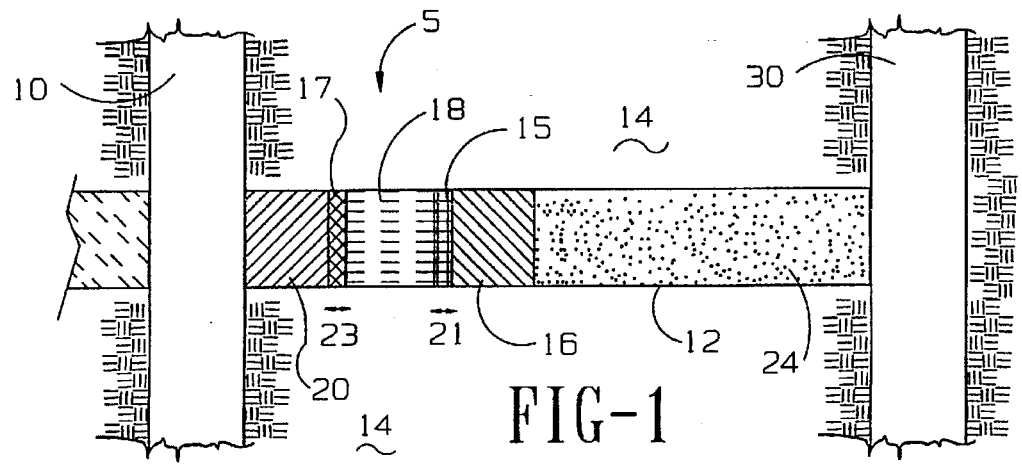
FIG. 1 is a schematic representation of the well and subterranean geological formation after injection of the treatment.
Figure 2:
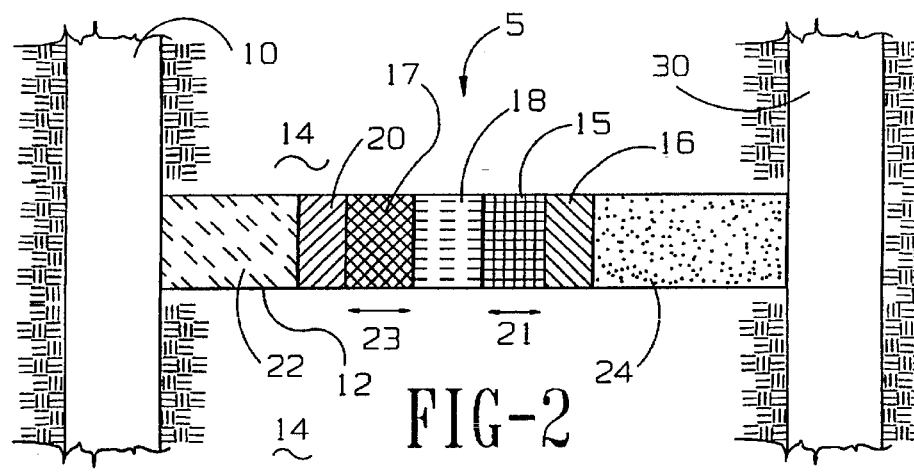
FIG. 2 is a schematic representation of the well and subterranean geological formation after initial injection of displacement water has begun.
Figure 3:
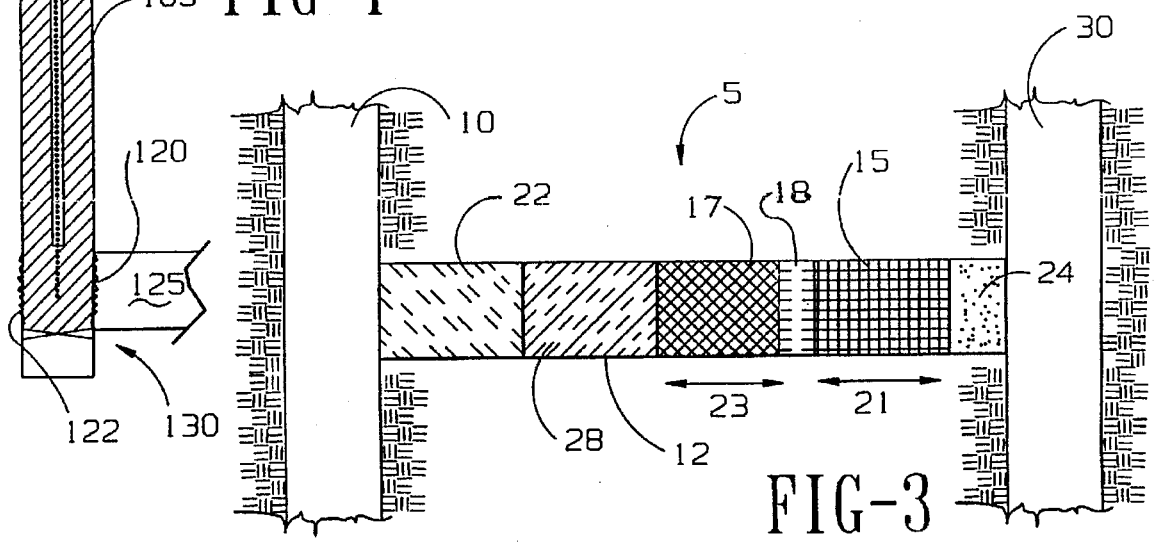
FIG. 3 is a schematic representation of the well and subterranean geological formation during the injecting of the displacement water at maximum rates.

The following is a general description of the preferred method as shown by FIGS. 1–3. The preferred method is sub-divided into three stages. The first stage is preparing the injection well 10 and the subterranean geologic formation 5. The second stage is injecting the treatment into the formation 5. The third stage is injecting displacement water volume 22 into formation 5.

Several types of water are referred to in the application. Unless otherwise stated, these waters are defined as follows: (i) connate water is water naturally borne with the formation; (ii) formation water is a mixture of water injected during waterfloods and connate water; (iii) a first water volume or fresh water is a water low in metallic ions which includes normal drinking water or lake water; (iv) a second water volume or fresh water is also a water low in metallic ions which includes normal drinking water or lake water; (v) displacement water is water injected to displace injected treatment fluids; and (vi) injection water is water used during a waterflood or other enhanced oil recovery processes. Also in the claims, elements have been referred to as "continuums". The reason is that it is anticipated that the term "continuum" may encompass one or more solutions.

Referring to FIG. 1, the process described relates to the method of restricting a fluid flow path 12 in subterranean geological formations 5 to facilitate the removal of hydrocarbons from the formations 5 during or following a waterflood or other known enhanced oil recovery processes. FIG. 1 refers to one embodiment of the invention where well bore 10 intersects the fluid flow path 12 which is channelized due to past or present waterflooding. The path 12, as shown in FIG. 1, can be vertical as well as horizontal and be separated by impermeable intervals. Normally the flow path 12 is between two impervious formations 14.

During the first stage, several preparation measures need to be taken prior to injecting the treatment. The first measure is stabilizing the injection pressure and the volume of injection water being introduced into the formation so that the movement of water from injection wells 10 to producing wells 30 is stabilized. The second measure is having all offset producing wells 30 that have channelized water pumping a maximum amount of water at all times one month before, during, and permanently after the treatment. The producing wells 30 should especially be pumping during the treatment shut-in time, the ramping up of the injection rate of the displacement water 22, and the initial injecting of displacement water 22 at maximum rates. If the other offset producing wells are not producing water, they should be shut-in. By having all offset producing wells 30 pumping a maximum amount of water 24, pressure in the formation 5 water channels is reduced thereby facilitating movement of the treatment into the channelized portion of the formation 5. The third measure is the injection well 10 needs to be equipped with a connection for switching injection fluids so that the treatment can be applied without having to shut down well 10 for any length of time.

The next stage is injecting the treatment into formation 5. The first step in the treatment is injecting a first water volume 16 into flow path 12 to displace fluids present in path 12 and to prevent mixing of formation water 24 or second reactant 24 and alkaline 18 during the initial application of the treatment. Water 16 is injected immediately after shut-in to maintain the same pressure and rate as the preparation injection water. Typically the fluid in path 12 is formation water 24. Because water 16 has a low content of metallic ions, water 16 serves as a spacer by preventing contact between the alkaline solution 18 and formation water 24 in or in the immediate vicinity of well 10. It is important that the scale does not form in well 10 or obstruction may occur at well 10.

The second step is injecting an alkaline volume 18 or first reactant 18 into path 12 thereby displacing water volume 16 and formation water or second reactant 24 ahead of alkaline volume 18 whereby water 16 separates and prevents premature mixing of water 24 and alkaline 18. Without stopping the injection of fluids, the injection of fresh water 16 is replaced with injection of alkaline 18. Preferably sodium hydroxide is used for alkaline volume 18. However potassium hydroxide, calcium hydroxide, or sodium carbonate are useful substitutes for sodium hydroxide and are equivalent to sodium hydroxide. The alkaline volume 18 can also be selected from an alkali metal in combination with a hydroxyl group. Injecting volume 18 creates a first water 16 and alkaline 18 mixed continuum or solution 15. Solution 15 will contain a mixture of water 16 and alkaline 18. Between water 16 and alkaline 18 the relative concentrations of water 16 and alkaline 18 will vary along the length 21 of solution 15.

The third step is injecting a second water volume 20 that has a low content of metallic ions as water 16 into path 12 behind alkaline 18. Without stopping the injection of fluids, the injection of alkaline 18 is replaced with injection of water 20. Water 20 serves as a spacer by preventing premature mixing of alkaline 18 and water 22 that will follow. Water 20 displaces alkaline 18 and any remaining traces of water 24 and 16. Second water 20 mixes with alkaline 18 creating continuum or solution 17. Between the alkaline 18 and water 20 the relative concentrations of water 20 and alkaline 18 will vary along a length 23 of solution 17.

After the treatment is completed, the injection of additional fluids into path 12 in the subterranean geological formation 5 is suspended for a period of time. The shut-in time allows the previous injections to gradually move into fluid flow channels that are intended to be obstructed. Additionally, the injections should slowly move into the fluid flow channels in the same sequence as applied whereby the water 16 separates water 24 from alkaline 18 and water 20 separates alkaline 18 from water 22. The offset producing wells 30 are pumping to channel the treatment toward these wells 30. During the shut-in period, prevention of fluid mixing and scale formation is desired. However some mixing will occur at the interfaces of alkaline 18 with water 16 and water 20 expanding solutions 15 and 17. Water volumes 16 and 20 and alkaline 18 will mix gradually together so that the first length 21 and second length 23 of solutions 15 and 17 are elongated, as shown by FIG. 2. At this point the mixtures should contain mostly alkaline 18, water 16, and water 20.

After waiting a sufficient period of time, the third stage begins by pumping displacement water volume or second reactant 22. Either formation water 24 or displacement water 22 can serve as the second reactant. Referring to FIG. 2, water 22 is pumped into flow path 12 behind alkaline 18, water 16, and water 20 displacing the injection fluids. The initial injection rate of displacement water 22 is at a low rate to prevent rapid mixing of the water 20, alkaline 18 and water 16 with displacement water 22 and formation water 24. The purpose of the low injection rate is to prevent mixing of these injection fluids. Ideally the only mixing is between alkaline 18 and waters 16 and 20. However, some slight scaling will begin to form behind water 20 as water 22 encounters alkaline 18 residue left on flow path 12. In addition, some slight scale will form within solution 15 because of a slight amount of water 24 left behind after water 16 passes. Water 24 will react with alkaline 18 within solution 15 to precipitate all of the magnesium as magnesium hydroxide and to precipitate some of the calcium as calcium hydroxide. The remaining calcium hydroxide stays in solution and provides an alkaline influence causing scale to form as it mixes with water 24 and solution 15. The magnesium and calcium precipitates will be dispersed along flow path 12 as solution 15 travels through the formation 5. As injection rates are slowly increased, the injection fluids will be fanning out across the formation 5. Thus the velocity of the treatments as they fan out through the formation 5 does not necessarily increase, but a greater volume of the formation 5 will be penetrated by the injection fluids and the whole injection series will dissipate.

The types of water 22 that can be used for this process are formation water that was earlier pumped from the formation 5 or flood water from the surface. The type of water 22 selected will depend on the formation 5 and location of oil in the formation 5. Adequate carbon dioxide and/or bicarbonate need to be present in the formation water 24, and especially the displacement water 22 for carbonate scale formation.

Referring to FIG. 3, once the maximum injection rates for water 22 occur, the treatment will slowly be fanning out throughout the fluid flow channels of formation 5. During this phase, most of the scale will form. Scale forms in three areas. First at the mixing of solution 15 and water 24, second at the mixing of solution 17 and with water 22 from continuum 28, and third in the area designated continuum 28. At this time, solution 15 will be a mixture of sodium hydroxide 18, water 16, and water 24 that has reacted with hydroxide 18. The reacted water 24 will provide the weaker alkali of calcium hydroxide and possibly a small amount of bicarbonate because the bicarbonate will have already reacted to form calcium carbonate scale. Most of the magnesium and some of the calcium will have precipitated as magnesium hydroxide and calcium hydroxide. The process depends on solution 15 to provide separation of alkaline 18 from water 24 so that excessive rapid mixing between the two does not occur. Solution 15 will gradually mix with water 24 to continuously form carbonate scale.

Alkaline 18 will gradually dissipate into solutions 15 and 17 as a result of mixing. However it will continue to leave some residue of alkaline behind, which will be vital in providing alkaline influence for scale depositing when this residue contacts water 22.

Solution 17 will be very similar to solution 15 as it will basically be a mixture of alkaline 18, water 20, and water 22. Solution 17 is also essentially free of magnesium and bicarbonate. Scale will occur at the mixing of solution 17 and with water 22 from solution 28. Water 22 from solution 28 will still have some amounts of calcium and bicarbonate which reacts with residual alkaline 18 inside of solution 17 to form scale. Solution 17 also provides a separation of alkaline 18 from water 22. This separation prevents rapid mixing and assists in diluting alkaline 18.

Behind solution 17 another solution 28 forms in which a preponderance of the scale forms when treating an injection well 10. Within solution 28, water 22 picks up alkaline influence left behind by alkaline 18 and residues of its reaction with waters 24 and 22. Furthermore, as solution 28 passes over formation 5, calcium hydroxide precipitates that were left behind from solution 15 and solution 17 are gradually dissolved as water 22 in solution 28 passes over the precipitates. As the calcium hydroxide dissolves, the newly available calcium ions react with bicarbonate in solution 28 to form calcium carbonate scale. Only a minor amount of magnesium hydroxide precipitates left behind from solution 15 and solution 17 dissolves as water 22 in solution 28 passes over. This carbonate scale forms on the interstices and channels of flow path 12. Other types of carbonate scale that may possibly form include magnesium, iron, barium, or strontium carbonate. The types of scale that form will depend upon the metallic ions present in the displacement water 22 and formation water 24 and the temperature of the formation 5.

Though one treatment should be sufficient, the treatments can be repeated until the desired restriction or obstruction of the formation 5 is obtained. Repeated treatments can be accomplished by repeating the injection of water 16 and alkaline 18 or by repeating the injection of water 16, alkaline 18, water 20, and water 22. The repeated injections will deposit additional scale on path 12 until the obstruction or desired restriction of path 12 is obtained. Once sufficient restriction of water flow through path 12 occurs, pumping additional water 22 into the formation 5 will cause water 22 to travel outside of path 12 into other flow paths thereby flushing hydrocarbons to producing well 30 and/or other producing wells. In addition, many other types of enhanced oil recovery processes can be used such as injection of liquid carbon dioxide, foam flooding, surfactant treated injection water, natural or nitrogen gas injection, and cross-flooding.

Depending on the situation, different modifications can be made to the preferred method. In the first stage, if the formation water 24 or displacement water 22 contain excessive amounts of magnesium, one can pre-treat the well 10 by pumping injection and displacement water 22 low in magnesium and high in calcium and bicarbonate three months prior to and after the treatment is applied. Formation water 24 and displacement water 22 high in magnesium is undesirable since magnesium reacts with the injected alkaline that forms scale deposits by reacting with calcium. Pumping injection water low in magnesium and high in calcium and bicarbonate will increase carbonate scaling. Also, if the formation water 24 and displacement water 22 have insufficient levels of bicarbonate for scale formation, then another displacement water 22 should be chosen that has sufficient levels of bicarbonate. Another possibility is adding bicarbonate or carbon dioxide to water 22 to boost bicarbonate levels.

Several second stage modifications can be undertaken as well. If a formation 5 with tight openings is to be treated, then water 16 should have a calcium, magnesium, and bicarbonate level below that of lake or drinking water. Another modification may be made if vugs, fractures, faults, very loose sandstone, and large openings in the wellbore 10 exist. In that case it is possible to inject a very concentrated suspension of calcium hydroxide for alkaline 18. An additional modification may be made if the formation waters 24 contain very little bicarbonate; sodium carbonate can be used for alkaline 18 to boost carbonate levels. A further modification can be done if the prevention of premature mixing of alkaline 18 with water 22 is desired, then volume 20 can be increased.

The following is a third stage modification. If the desire is to have scale deposits as far away from the well 10 as possible, water low in metallic cations similar to water 20 can be used initially for displacement water 22. Once water 16, water 20, and hydroxide 18 have fanned out a sufficient distance in the formation 5, water with high levels of metallic ions can be used for water 22.

This method can be applied in various types of formations 5, such as sandstone, plain limestone, vuggy limestone, sandy limestone, fractured limestone, plain dolomite, vuggy dolomite, sandy dolomite, fractured dolomite, and conglomerate. For each type of formation 5, an operator will have to manipulate variables such as volume and metallic ion content of waters 16 and 20, volume and concentration of alkaline 18, the metallic ion content of displacement water 22, and fluid injection rates. The following examples illustrate the process with different types of alkalines 18. Example 1 uses sodium hydroxide in a sandstone formation.

EXAMPLE 1

A field test was conducted in a sandstone formation which had been flooded with water. Prior to treating the well, 570 barrels per day (b/d) of water were injected into the formation. The offset producing well was pumping 410 b/d of which 405 b/d was water for two months. The reservoir temperature was 85–90 degrees Fahrenheit and the bottom hole pressure was 1600 psi. The injection well was treated with 105 barrels of fresh water that was injected at a rate of 600 b/d, 194 barrels of 20.48 weight percent sodium hydroxide that was injected at a rate of 665 b/d, and then 104 barrels of fresh water that was injected at 533 b/d. The fresh water contained 82 mg/l calcium, 10 mg/l magnesium and 120 mg/l bicarbonate. The well was shut in for three days. After three days, injection of displacement water from the producing well was begun at the low rate of 60 b/d, which was approximately 10 percent of the pre-treatment injection water rate. The displacement water had a pH of 7.6 and was comprised of the following:

| | |
|---|---|
| Bicarbonate | 1,122 mg/l |
| Calcium | 680 mg/l |
| Magnesium | 1,118 mg/l |
| Sodium/Potassium | 5,810 mg/l |
| Sulfate | 2,105 mg/l |
| Chloride | 11,221 mg/l |
| Total Solids | 22,056 mg/l |

On the fourth day, the injection rate was increased to 180 b/d at 425 psi in the a.m. and then increased to 250 b/d at 525 psi in the p.m. On the sixth day, the injection well was taking 227 b/d at 500 psi and 262 b/d at 550 psi. On the eighth day the injection rate was increased to 308 b/d at 530 psi. By the ninth day injection rate was at 576 b/d at 625 psi, and by the seventeenth day stabilized at 525 b/d at 820 psi. Between the seventeenth day and the sixtieth day, the rate oscillated between 525 b/d at 820 psi and 780 b/d at 780 psi.

The injection of displacement water was continued thereafter. After the injection treatment, the temperature remained the same; however, the bottom hole pressure increased to 1800 psi. This injection procedure prevented rapid and/or thorough mixing of the alkaline treatment with the formation and displacement waters and therefore accomplished a very gradual mixing. The injection rate over the following three months at the same pressure was reduced from over 900 b/d to 525 b/d. The offset producing well water production fell from 405 b/d before the injection well treatment to 106 b/d after the injection well treatment over a period of 10 months.

EXAMPLE 2

The process is the same as discussed in Example 1, except potassium hydroxide is used as the alkaline instead sodium hydroxide. To use potassium hydroxide instead of sodium hydroxide, 1.4 times the volume of potassium hydroxide is used in place of the sodium hydroxide. So for using potassium hydroxide in Example 1, one will use 280 barrels of 20.48 percent potassium hydroxide. All other variables will remain substantially the same.

EXAMPLE 3

The process is the same as discussed in Example 1, except calcium hydroxide is used as the alkaline instead sodium hydroxide. To use calcium hydroxide instead of sodium hydroxide, 1.0 times the volume of calcium hydroxide is used in place of the sodium hydroxide. So for using calcium hydroxide in Example 1, one will use 200 barrels of 20.48 percent calcium hydroxide. All other variables will remain substantially the same.

EXAMPLE 4

The process is the same as discussed in Example 1, except sodium carbonate is used as the alkaline instead sodium hydroxide. To use sodium carbonate instead of sodium hydroxide, 2.4 times the volume of sodium carbonate is used in place of the sodium hydroxide. So for using sodium carbonate in Example 1, one will use 480 barrels of 20.48 percent sodium carbonate. All other variables will remain substantially the same.

Though the temperature is not controlled, higher temperatures can increase scale formation. As the injection fluids travel through the formation, the formation heats the fluids. The farther the fluids travel from the injection well, the higher the temperature of the injection fluids. Therefore, more scaling will occur farther from the injection well than near the well. Above temperatures of 115 degrees Fahrenheit, the types of scale that may form include magnesium carbonate and metallic hydroxide scales such as magnesium hydroxide.

To measure the effects of temperature with regard to carbonate scale formation, a test was conducted with equal quantities of all four alkalines to show scaling tendency measured by the Langlier calcium carbonate scaling tendency index. The results were:

| SCALING TENDENCY WITH RESPECT TO TEMPERATURE | | | |
|---|---|---|---|
| Treatment | pH | Langlier Index @ 77 F. | Langlier Index @ 122 F. |
| None | 7.02 | 0.00 | 0.48 |
| Potassium Hydroxide | 7.81 | 0.90 | 1.38 |
| Sodium Hydroxide | 8.54 | 1.26 | 1.82 |
| Calcium Hydroxide | 7.53 | 0.64 | 1.12 |
| Sodium Carbonate | 7.49 | 0.53 | 1.01 |

For Example 1, the variables indicated can fall within the following ranges. The injection pressure can vary from 100–1000 psi. Injection rates for all fluids are the same as the normal injection rate of injection water which can range from 100 b/d–2000 b/d depending on the formation to be obstructed. The hydroxide volume can range from 20 barrels to 1000 barrels of 20 weight percent solution of sodium hydroxide or equivalents depending on the type of formation to be obstructed. The sodium hydroxide to be used can range from 5 to 30 percent, with a volume of 5–250 barrels per offset producing well. Fresh water volumes can range from 20 barrels to 4000 barrels. The constituents of the fresh water volumes can range from 0 mg/l to 100 mg/l calcium, 0 mg/l to 50 mg/l magnesium, and 0 mg/l to 200 mg/l bicarbonate. The ratio of fresh water volume to hydroxide volume can range from 1:1 fresh water volumes to hydroxide to 4:1 fresh water volumes to hydroxide unless extremely high magnesium levels and the nature of the formation require additional fresh water to be added. The shut-in period can range from 3 to 7 days. The initial injection of displacement water after the shut-in is 5 to 15 percent of the normal injection rate. The ramping up of the injection rate can range from 14 to 28 days. The pH level for forming calcium carbonate scale in the continuums is between 7.0–9.0. If the alkaline influence is significantly above a pH of 9, however, then the magnesium hydroxide precipitates which is undesirable because the precipitates remove hydroxide from the solution.

The preferred ranges of the variables described in Example 1 are injecting fresh water, sodium hydroxide, and displacement water at the same rate as injecting flood water prior to treatment. The normal injection rate of flood water can range from 100 b/d to 2000 b/d, depending on the formation. The volume of hydroxide used should be 100 barrels per offset producing well. The first fresh water volume should be one to two times the hydroxide used. The second fresh water volume should be one to two times the hydroxide used. The preferred alkaline used is twenty weight percent sodium hydroxide. It is preferred that the fresh water volumes contain 0 mg/l calcium, 0 mg/l magnesium, and 0 mg/l bicarbonate. The shut-in period would be from 4–7 days. After the shut-in period, the injection rate would be ramped up 7 percent of the flood water injection rate per day for a period of 2–4 weeks. The displacement water would have a pH of 7.6 and comprised of the following:

| | |
|---|---|
| Bicarbonate | 1,122 mg/l |
| Calcium | 680 mg/l |
| Magnesium | 1,118 mg/l |
| Sodium/Potassium | 5,810 mg/l |
| Sulfate | 2,105 mg/l |
| Chloride | 11,221 mg/l |
| Total Solids | 22,056 mg/l |

The pH of the scale forming continuums would be between 7.8–9.0.

Though the invention has been described concerning obstructing fluid flow in waterflood oil formations, the process could be similarly used to obstruct fluid flow paths in producing oil and gas wells with excess water production other than from an offset injection well, in oil producing intervals, in formations adjacent to the oil/gas producing intervals, in casing leaks, in lost circulation intervals, and in oil formations treated with other enhanced oil recovery techniques. There are three additional ways to apply the process. Referring to FIGS. 1–3, the first process is for when excessive water in an oil and gas producing well is originating from an entirely separate interval from the oil and gas producing interval. The first step is separating the intervals with a physical separation mechanism such as a packer, bridge plug, or other method so that the oil and gas interval will not be exposed to the treatment. This is the situation where casing leaks, lost circulation intervals, and other abnormal situations may be present. The treatment is similar to the treatment described in FIGS. 1 and 2; however, the volume of waters 16 and 20 will be less because it is desirable to start scaling as soon as the treatment is in the formation 5. Furthermore well 10 is a producing well and not an injection well. Also water 22 is displacement water high in calcium and bicarbonate. Next injecting the displacement water 22 continues until the solutions 15 and 17 are pushed a predetermined distance from the well bore 10. Next, removing the displacement water 22 through well bore 10 pulls continuums 15 and 17 closer to well bore 10. By pulling solutions 15 and 17 by removing displacement water 22, scale is created in an opposite direction to that formed by pumping displacement water 22 into the formation 5.

Referring to FIGS. 1–3, the second process is the same as the first except water 16 will be a larger volume to prevent as much scale as possible in front of the treatment by restricting mixing with water 24 and with continuum 15 and alkaline 18 and like the first method, well bore 10 is a producing well, not an injection well. Displacement water 22 in this instance must be free of calcium, magnesium, and any other metallic ion that might form scale in the presence of an elevated pH. Therefore when displacement water 22 mixes with continuum 17 and alkaline 18 and contacts residue left behind in continuum 28, no scale is formed. After moving the injection fluids a predetermined distance, the well is put back in production and the flow is reversed. Consequently the scale is formed only in the water channels as water 24 mixes and is exposed to residual alkaline influence as it returns to the producing well 10. The channels containing oil or gas do not scale. This process can be used for treating casing leaks and lost circulation intervals.

Figure 4:
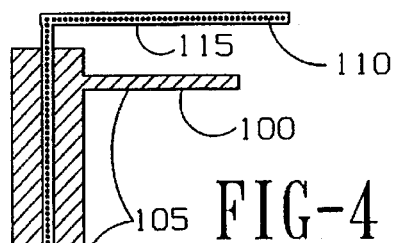
FIG. 4 is a schematic representation of another embodiment where injecting of the alkaline and water occurs in separate piping strings.

The third method is shown in FIG. 4. This process restricts a fluid flow path 125 at a predetermined location 120 in subterranean geological formations 130 for reducing water flow in an oil and gas producing well, casing leaks and lost circulation intervals. Water 100 is pumped into the formation 130 through piping string 105. A first reactant 110 is pumped into the formation 130 through piping string 115. Reactant 110 is an alkaline, preferably sodium hydroxide. Simultaneously, a second reactant 100 is pumped into the formation 130 at a consistent rate. Reactant 100 is a water with high levels of calcium and bicarbonate. The water 100 and alkaline solution 110 mix at the predetermined location 120 forming a solution 122 in the formation 130 to be obstructed. The mixture of water 100 and alkaline 110 form scale at location 120 which after sufficient length of time, will obstruct the formation 130 at location 120.

During this third method, there will be no need to control temperature on the surface, and the surface injection pressure will be as required to accomplish the desired volume. The key is maintaining a pH of 7.0 to 9.0 at the location in the formation to be scaled. Therefore the water volume, alkaline volume, and alkaline concentration can vary as long as the pH of 7.0 to 9.0 is maintained at the location desired to be scaled. For example, if 500 barrels per day of water 100 are being injected, then concurrently an alkaline 110 comprising of 20 gallons of water mixed with 70 pounds of sodium hydroxide is injected over a period of one day creating a 400 mg/l sodium hydroxide solution 122. This results in a pH of approximately 7.0–9.0, whereby 8.0–9.0 creates a strong scaling tendency. The water 100 should at least contain the following:

Bicarbonate: 1,586 mg/l

Calcium: 264 mg/l

Alkalines 110 used for this process are sodium hydroxide, potassium hydroxide, calcium hydroxide, or sodium carbonate.

While the preferred embodiment of the invention has been shown and described, it will be apparent to those skilled in this art that various modifications may be made in the embodiment without departing from the spirit of the present invention. Therefore, the embodiments of the invention in which an exclusive property or privilege is claimed are defined as follows:

I claim:

1. A method for restricting a fluid flow path in subterranean geological formations to facilitate the removal of hydrocarbons from said subterranean geological formations during enhanced oil recovery techniques, said method comprising the steps of:

injecting a first water volume into said fluid flow path thereby displacing fluids present in said fluid flow path;

injecting an alkaline volume into said fluid flow path thereby displacing said first water volume ahead of said alkaline volume; and creating a first water and alkaline mixed continuum between said first water volume and said alkaline volume wherein the relative concentrations of water and alkaline vary along a length of said first water and alkaline mixed continuum wherein said relative concentrations of water and alkaline are conducive to the formation of scale upon surfaces of said subterranean geological formations.

2. The method for restricting a fluid flow path in subterranean geological formations to facilitate the removal of hydrocarbons from said subterranean geological formations during enhanced oil recovery techniques as recited in claim 1, said alkaline is selected from the group consisting of sodium hydroxide, potassium hydroxide, calcium hydroxide, and sodium carbonate.

3. The method for restricting a fluid flow path in subterranean geological formations to facilitate the removal of hydrocarbons from said subterranean geological formations during enhanced oil recovery techniques as recited in claim 1, said method further comprising the steps of:

injecting a second water volume into said fluid flow path behind said alkaline volume thereby displacing said first water volume and said alkaline volume ahead of said second water volume; and creating a second water and alkaline mixed continuum between said alkaline volume and said second water volume wherein the relative concentrations of water and alkaline vary along a length of said second water and alkaline mixed continuum wherein said relative concentrations of water and alkaline are conducive to the formation of scale upon surfaces of said subterranean geological formations.

4. The method for restricting a fluid flow path in subterranean geological formations to facilitate the removal of hydrocarbons from said subterranean geological formations during enhanced oil recovery techniques as recited in claim 3, said method further comprising the steps of:

refraining from injecting additional fluids into said fluid flow path in said subterranean geological formations for a period of time sufficient to allow said water volumes and said alkaline volume to move into said fluid flow path so that said first and second lengths of said first and second water and alkaline mixed continuums in which said relative concentrations of water and alkaline are conducive to the formation of scale upon surfaces of said subterranean geological formations are elongated.

5. The method for restricting a fluid flow path in subterranean geological formations to facilitate the removal of hydrocarbons from said subterranean geological formations during enhanced oil recovery techniques as recited in claim 3, said method further comprising the steps of:

pumping a displacement water volume into said fluid flow path behind said water volumes and alkaline volume thereby displacing said first water volume, said alkaline volume, said second water volume ahead of said displacement water volume;

forming scale upon surfaces of said fluid flow path as said first water and alkaline mixed continuum is pumped through said fluid flow path ahead of said displacement water volume; and forming scale upon surfaces of said fluid flow path as said second water and alkaline mixed continuum is pumped through said fluid flow path ahead of said displacement water volume thereby forming additional scale upon the scale previously formed.

6. The method for restricting a fluid flow path in subterranean geological formations to facilitate the removal of hydrocarbons from said subterranean geological formations during enhanced oil recovery techniques as recited in claim 5, said method further comprising the steps of:

applying an additional treatment of scaling by repeating the steps of claim 5 thereby adding scale build-up upon the scale previously deposited to further restrict fluid flow through said fluid flow path.

7. The method for restricting a fluid flow path in subterranean geological formations to facilitate the removal of hydrocarbons from said subterranean geological formations during enhanced oil recovery techniques as recited in claim 6, said method further comprising the steps of:

repeating the steps of claim 6 until scale has been sufficiently built up in said fluid flow path to cause said pumped displacement water volume to migrate through said subterranean geological formation along other fluid flow paths than that which as been restricted, thereby flushing hydrocarbons from said subterranean geological formation ahead of said displacement water volume.

8. The method for restricting a fluid flow path in subterranean geological formations to facilitate the removal of hydrocarbons from said subterranean geological formations during enhanced oil recovery techniques as recited in claim 1, said method further comprising the steps of:

applying an additional treatment of scaling by repeating the steps of claim 1 thereby adding scale build-up upon the scale previously deposited to further restrict fluid flow through said fluid flow path.

9. The method for restricting a fluid flow path in subterranean geological formations to facilitate the removal of hydrocarbons from said subterranean geological formations during enhanced oil recovery techniques as recited in claim 5, said method further comprising the steps of:

removing said displacement water volume from said fluid flow path behind said first water volume, said alkaline volume, and said second water volume thereby displacing said first water volume, said alkaline volume, and said second water volume;

forming scale upon surfaces of said fluid flow path as said first water and alkaline mixed continuum and said second water and alkaline mixed continuum are pulled through said fluid flow path; and forming scale upon surfaces of said fluid flow path in an opposite direction as scale formed by pumping said displacement water volume into said subterranean geological formation.

10. The method for restricting a fluid flow path in subterranean geological formations to facilitate the removal of hydrocarbons from said subterranean geological formations during enhanced oil recovery techniques as recited in claim 5, further comprising the step of:

establishing a third continuum behind said second continuum wherein the relative concentrations of water and alkaline are conducive to the formation of scale upon surfaces of said subterranean geological formations.

11. The method for restricting a fluid flow path in subterranean geological formations to facilitate the removal of hydrocarbons from said subterranean geological formations during enhanced oil recovery techniques as recited in claim 1, said method further comprising:

wherein said first water volume contains low levels of metallic ions.

12. The method for restricting a fluid flow path in subterranean geological formations to facilitate the removal of hydrocarbons from said subterranean geological formations during enhanced oil recovery techniques as recited in claim 5, said method further comprising:

wherein said displacement water volume contains low levels of metallic ions.

13. The method for restricting a fluid flow path in subterranean geological formations to facilitate the removal of hydrocarbons from said subterranean geological formations during enhanced oil recovery techniques as recited in claim 1, said method further comprising:

wherein said alkaline volume is selected from a hydroxyl group in combination with an alkali metal.

14. A method for restricting a fluid flow path in subterranean geological formations to facilitate the removal of hydrocarbons from said subterranean geological formations, said method comprising the step of:

introducing a first reactant that mixes with a second reactant thereby creating a continuum conducive to the formation of scale upon fluid flow paths;

injecting a first water volume into said fluid flow path thereby displacing fluids present in said fluid flow path;

injecting said first reactant which is an alkaline volume into said fluid flow path thereby displacing said first water volume ahead of said alkaline volume;

creating a first water and alkaline mixed continuum between said first water volume and said alkaline volume wherein the relative concentrations of water and alkaline vary along a length of said first water and alkaline mixed continuum wherein said relative concentrations of water and alkaline are conducive to the formation of scale upon surfaces of said subterranean geological formations;

injecting a second water volume into said fluid flow path behind said alkaline volume thereby displacing said first water volume and said alkaline volume ahead of said second water volume;

creating a second water and alkaline mixed continuum between said alkaline volume and said second water volume wherein the relative concentrations of water and alkaline vary along a length of said second water and alkaline mixed continuum wherein said relative concentrations of water and alkaline are conducive to the formation of scale upon surfaces of said subterranean geological formations;

pumping said second reactant which is a displacement water volume into said fluid flow path behind said water volumes and alkaline volume thereby displacing said first water volume, said alkaline volume, said second water volume ahead of said displacement water volume;

forming scale upon surfaces of said fluid flow path as said first water and alkaline mixed continuum is pumped through said fluid flow path ahead of said displacement water volume;

forming scale upon surfaces of said fluid flow path as said second water and alkaline mixed continuum is pumped through said fluid flow path ahead of said displacement water volume thereby forming additional scale upon the scale previously formed;

removing said displacement water volume from said fluid flow path behind said first water volume, said alkaline volume, and said second water volume thereby displacing said first water volume, said alkaline volume, and said second water volume;

forming scale upon surfaces of said fluid flow path as said first water and alkaline mixed continuum and said second water and alkaline mixed continuum are pulled through said fluid flow path; and forming scale upon surfaces of said fluid flow path in an opposite direction as scale formed by pumping said displacement water volume into said subterranean geological formation.

15. A process for restricting a fluid flow path in a subterranean formation, said process comprising:

creating a mixed fluid continuum in a fluid flow path of a subterranean formation between a leading fluid volume predominantly comprising water and a trailing fluid volume at least partially comprising an alkali so that relative alkalinity varies across said mixed fluid continuum and causes at least a portion of said continuum to be conducive to the formation of scale upon surfaces of said fluid flow path of said subterranean formation.

16. The process as recited in claim 15, said process further comprising:

forming scale upon said surfaces of said fluid flow path of said subterranean formation by passing said mixed fluid continuum through said flow path.

17. The process as recited in claim 15, said process further comprising:

initially injecting said leading fluid volume into said fluid flow path of said subterranean formation thereby displacing fluids present in said fluid flow path; and subsequently injecting said trailing fluid volume thereby displacing said leading volume ahead of said trailing volume in said fluid flow path.

* * * * *